J. W. BURLEIGH.
DYNAMO ELECTRIC MACHINE.
APPLICATION FILED AUG. 10, 1908.
946,105.
Patented Jan. 11, 1910.
Fig. I.
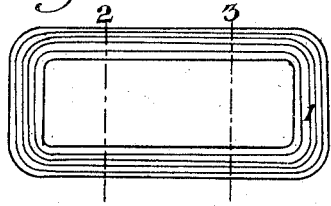
Fig. II.
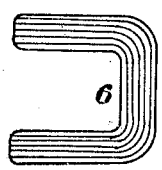
Fig. III.
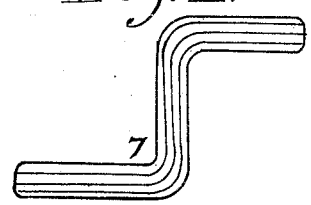
Fig. IV.
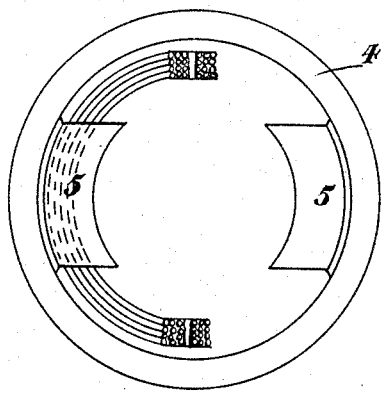
Fig. VI.
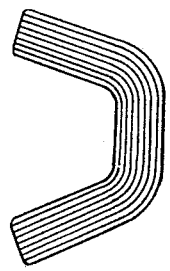
Fig. V.
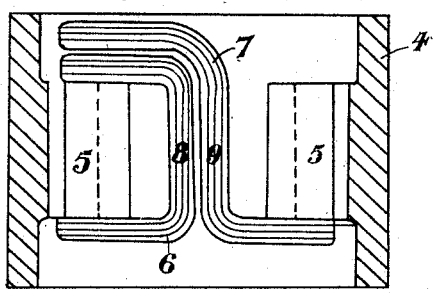
Fig. VII.
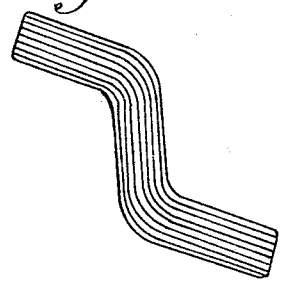
Witnesses.
H. Strauss
G. M. Trogner
Inventor,
John Wesley Burleigh,
by Mason Fenwick Lawrence
his Attorneys.

UNITED STATES PATENT OFFICE.

JOHN WESLEY BURLEIGH, OF TAUNTON, ENGLAND, ASSIGNOR TO ZONE DYNAMO & MOTOR PATENTS COMPANY LIMITED, OF LONDON, ENGLAND, A CORPORATION OF GREAT BRITAIN.

DYNAMO-ELECTRIC MACHINE.

946,105.  Specification of Letters Patent.  Patented Jan. 11, 1910.

Application filed August 10, 1908. Serial No. 447,781.

*To all whom it may concern:*

Be it known that I, JOHN WESLEY BURLEIGH, a subject of the King of England, residing at Taunton, in England, have invented certain new and useful Improvements in Dynamo-Electric Machines, of which the following is a specification.

My invention relates to dynamo electric machines, and has especial reference to an improved coil winding therefor.

In order that my invention may be readily understood reference is made to the accompanying drawings, in which similar letters refer to similar parts throughout the several views.

Figure I is a plan of a coil after it has been wound on a former but before it has been bent to shape, Fig. II is a view of the same coil after it has been bent to an arched form as seen in elevation, Fig. III is a similar coil after it has been bent to an ogee shape as seen in elevation. Fig. IV a diagram of a well known form of two pole carcass to which my coils may be adapted, Fig. V is a plan of a similar carcass, the cylindrical yoke being shown in section, showing the coils in position, Fig. VI is a slightly modified form of arched coil, and Fig. VII a slightly modified form of ogee coil.

Referring to Fig. I, 1 is a coil of covered wire after it has been wound on a former but before it is bent to the proper shape for insertion in the carcass of a machine. It will be seen that it is of elongated form and flat. To adapt it for use this coil is bent at or about the dotted lines 2 and 3 of the figure. When the bends are both in the same direction what may conveniently be termed an arched coil is obtained. When the flat coil is bent through angles less than right angles the modified form of arched coil shown in Fig. VI is obtained. When however the flat coil is bent at right angles in opposite directions that is to say at or about the line 2 in one direction and at or about the line 3 in the opposite direction then we get what may conveniently be termed an ogee coil as is shown in Fig. III: and when these bendings are through angles less than right angles we get the modified form of ogee coil shown in Fig. VII.

Referring now to Figs. IV and V it will be seen that the carcass is one of well known form in which 4 is a cylindrical yoke having the pole pieces 5, 5 projecting inward therefrom. The armature is not shown nor is the supporting frame for the bearings which supporting frame may consist of brackets integral with the yoke as is well known.

In practicing my invention I provide each carcass as shown in plan in Fig. V with two coils 6, 7 one an arched coil and the other an ogee coil these coils being however of different length the ogee coil somewhat longer than the arched coil which it overlaps. In saying that the ogee coil is longer than the arched coil what is meant is that each convolution or turn is longer and not necessarily that the total number of turns or convolutions is greater. In inserting these coils into the carcass the arched coil is first placed in position as shown in Fig. V and then the ogee coil is mounted over it as shown in the figure, that is to say over it at one end of the carcass though separated as will be seen on the opposite side of the carcass at the other end thereof. It will thus been seen that at one end of the carcass the coils overlap while at the other end they are spread apart the arched coil lying up against or close to one pole piece only and the ogee coil lying up against or close to one end of each pole piece. The straight parts 8, 9 of the coils are intended to lie parallel to and as closely as possible over those of the armature coils which are undergoing commutation.

It will be seen that in Fig. V I show the coils separately illustrated in Figs. II and III as employed but it is quite obvious that I might substitute therefor the modified forms of coil shown in Figs. VI and VII. When these latter forms of coil are employed a more gradual inductive effect is obtained when the machine is in operation.

The modified forms of coil shown in Figs. VI and VII are usually more easily slipped into position than those shown in Figs. II and III.

By means of my invention I secure almost sparkless collection at the brushes of the machine and I greatly reduce the magnetic leakage as well as the size and weight of the machine. Further I greatly reduce the amount of copper necessary and through the spacing apart of the two coils particularly at the end at which they are spread out I facilitate cooling. The result is that I obtain a very cheap light and efficient machine.

It is of course to be understood that I use the term dynamo electric machine in its generic sense including motors, motor generators and the like as well as generators. It must also be understood that the two coils mentioned may be so connected as to constitute in fact a single coil.

The coils have been referred to as being first made flat and then bent to arched or ogee shape. It must be understood that they may be made on formers of such construction as to give them the arched and ogee shapes respectively in the first instance, if desired.

What I claim as my invention and desire to secure by Letters Patent, is:—

1. In a dynamo electric machine the combination of two field magnet cores, an armature; an arched coil adjoining one of the cores and having straight parts lying in the neutral zones close over and parallel with the axis of the armature, and an ogee coil, the coils exciting both field magnet cores, and the curved part of the ogee coil overlying the curved part of the arched coil on one side of one core while diverging from it on the other side of the machine and having a straight part adjoining the two curved parts lying in the neutral zone alongside the straight part of the arched coil close over and parallel with the axis of the armature.

2. In a dynamo electric machine, the combination of two field magnet cores an arched coil with an ogee coil exciting said cores, the straight parts of both of which lie alongside of each other in a neutral zone and close over and parallel with the axis of the armature and a cylindrical yoke.

3. In a dynamo electric machine, in combination, a pair of field magnet cores oppositely located, an armature; a coil of arch form adjoining one of said cores and an ogee coil having one end adjacent to the same core and the other end of which is adjacent to the opposite core, the straight parts of both coils lying in the neutral zones close to the armature and parallel to its axis.

In testimony whereof I affix my signature in presence of two witnesses.

JOHN WESLEY BURLEIGH.

Witnesses:
EDWARD JAMES POPE,
ARNOLD EDWIN REMFRY.